US011210503B2

(12) United States Patent
Taigman et al.

(10) Patent No.: US 11,210,503 B2
(45) Date of Patent: Dec. 28, 2021

(54) SYSTEMS AND METHODS FOR FACIAL REPRESENTATION

(71) Applicant: Facebook, Inc., Menlo Park, CA (US)

(72) Inventors: Yaniv Taigman, Batzra (IL); Ming Yang, Valencia, CA (US); Marc'Aurelio Ranzato, Hoboken, NJ (US)

(73) Assignee: Facebook, Inc., Menlo Park, CA (US)

( * ) Notice: Subject to any disclaimer, the term of this patent is extended or adjusted under 35 U.S.C. 154(b) by 89 days.

(21) Appl. No.: 16/127,727

(22) Filed: Sep. 11, 2018

(65) Prior Publication Data

US 2019/0171868 A1    Jun. 6, 2019

Related U.S. Application Data

(63) Continuation of application No. 14/530,585, filed on Oct. 31, 2014, now Pat. No. 10,095,917.

(60) Provisional application No. 61/899,877, filed on Nov. 4, 2013.

(51) Int. Cl.
| | |
|---|---|
| *G06K 9/00* | (2006.01) |
| *G06N 3/04* | (2006.01) |
| *G06T 3/00* | (2006.01) |
| *G06T 15/20* | (2011.01) |

(52) U.S. Cl.
CPC ..... *G06K 9/00295* (2013.01); *G06K 9/00268* (2013.01); *G06K 9/00288* (2013.01); *G06N 3/0454* (2013.01); *G06T 3/0006* (2013.01); *G06T 3/0093* (2013.01); *G06T 15/205* (2013.01); *G06T 2210/44* (2013.01)

(58) Field of Classification Search
CPC .......... G06K 9/00228; G06K 9/00268; G06K 9/00288
See application file for complete search history.

(56) References Cited

U.S. PATENT DOCUMENTS

| | | |
|---|---|---|
| 5,991,429 A | 11/1999 | Coffin |
| 6,556,196 B1 | 4/2003 | Blanz |
| 8,436,893 B2 | 5/2013 | McNamer |
| 2002/0081032 A1* | 6/2002 | Chen .................... G06T 7/12 382/199 |

(Continued)

FOREIGN PATENT DOCUMENTS

| | | |
|---|---|---|
| GN | 102622585 | 8/2012 |
| JP | 2005316888 | 11/2005 |

(Continued)

OTHER PUBLICATIONS

Rowley, "Neural Network-Based Face Detection" IEEE 1998 (Year: 1998).*

(Continued)

*Primary Examiner* — Mark Roz
(74) *Attorney, Agent, or Firm* — Sheppard Mullin Richter & Hampton LLP

(57) ABSTRACT

Systems, methods, and non-transitory computer readable media can align face images, classify face images, and verify face images by employing a deep neural network (DNN). A 3D-aligned face image can be generated from a 2D face image. An identity of the 2D face image can be classified based on provision of the 3D-aligned face image to the DNN. The identity of the 2D face image can comprise a feature vector.

17 Claims, 11 Drawing Sheets

(56) References Cited

U.S. PATENT DOCUMENTS

| | | | |
|---|---|---|---|
| 2003/0123713 | A1 | 7/2003 | Geng |
| 2005/0276452 | A1 | 12/2005 | Boland |
| 2006/0176301 | A1 | 8/2006 | Sohn |
| 2008/0152213 | A1 | 6/2008 | Medioni |
| 2008/0187213 | A1* | 8/2008 | Zhang ............... G06K 9/00281 |
| | | | 382/159 |
| 2009/0309878 | A1 | 12/2009 | Otani |
| 2011/0025829 | A1 | 2/2011 | McNamer |
| 2011/0102553 | A1 | 5/2011 | Corcoran |
| 2013/0076943 | A1 | 3/2013 | Yoon |
| 2013/0243255 | A1 | 9/2013 | Williams |
| 2014/0147022 | A1 | 5/2014 | Zhou |

FOREIGN PATENT DOCUMENTS

| | | |
|---|---|---|
| JP | 2006139367 | 6/2006 |
| JP | 200787345 | 4/2007 |
| JP | 2009301170 | 12/2009 |
| KR | 1020060080732 | 7/2006 |
| KR | 200787345 | 4/2007 |
| KR | 1020110088361 | 8/2011 |

OTHER PUBLICATIONS

Ishimoto, Pose-Robust Face Recognition based on 3D Shae Reconstruction, IEEE 2009 (Year: 2009).*
European Patent Application No. 14191670.0, Examination Report dated Jul. 12, 2016.
European Patent Application No. 14191670.0, Search Report dated Jul. 22, 2015.
International Application No. PCT/US2014/063722, International Search Report and Written Opinion dated Jan. 8, 2015.
Asthana, Akshay et al., "Fully Automatic Pose-Invariant Face Recognition via 3D Pose Normalization," 2011 IEEE International Conference on Computer Vision (ICCV), pp. 937-944, Nov. 2011.
Chen, Chun-Wei et al., "3D Active Appearance Model for Aligning Faces in 2D Images," IEEE/RSJ International Conference on Intelligent Robots and Systems (IROS 2008), pp. 3133-3139, Sep. 2008.
Garcia, Christophe et al., "Convolutional Face Finder: A Neural Architecture for Fast and Robust Face Detection," IEEE Transactions on Pattern Analysis and Machine Intelligence, vol. 26, Iss. 11, pp. 1408-1423, Nov. 2004.
Heisele, Bernd et al., "Face Processing: Advanced Modeling and Methods—Chapter 14—Morphable Models for Training a Component-Based Face Recognition System," Editors: Wenyi Zhao and Rama Chellappa, Academic Press, SBN 978-0-12-088452-0, pp. 439-462, Oct. 2005.
Li, Stan Z. et al., "Handbook of Face Recognition," Second Edition, Springer Science and Business Media, ISBN 978-0-85729-931-4, pp. 1-4, Aug. 22, 2011.
Nair, Vinod et al., "3D Object Recognition with Deep Belief Nets," Advances in Neural Information Processing Systems 22 (NIPS), pp. 1339-1347, Dec. 7, 2009.
Prabhu, Utsav et al., "Unconstrained Pose-Invariant Face Recognition Using 3D Generic Elastic Models," IEEE Transactions on Pattern Analysis and Machine Intelligence, vol. 33, Iss. 10, pp. 1952-1961, Jun. 2011.
Sun, Yi et al., "Hybrid Deep Learning for Face Verification," 2013 IEEE International Conference on Computer Vision (ICCV), pp. 1489-1496, Dec. 2013.
Wikimedia Foundation, Inc., "Deep Belief Network," Wikipedia online encyclopedia entry, 2013.
Wolf, Lior et al., "Similarity Scores Based on Background Samples," Proceedings of the 9th Asian Conference on Computer Vision (ACCV 2009), Part II, pp. 88-97, Sep. 2009.
Park, Unsang et al., "Age-Invariant Face Recognition," IEEE Transactions on Pattern Analysis and Machine Intelligence, vol. 32, No. 5, pp. 947-954, May 2010.
Korean Application No. 10-2016-7014766, Examination Report dated Sep. 29, 2020, 9 pages.

* cited by examiner

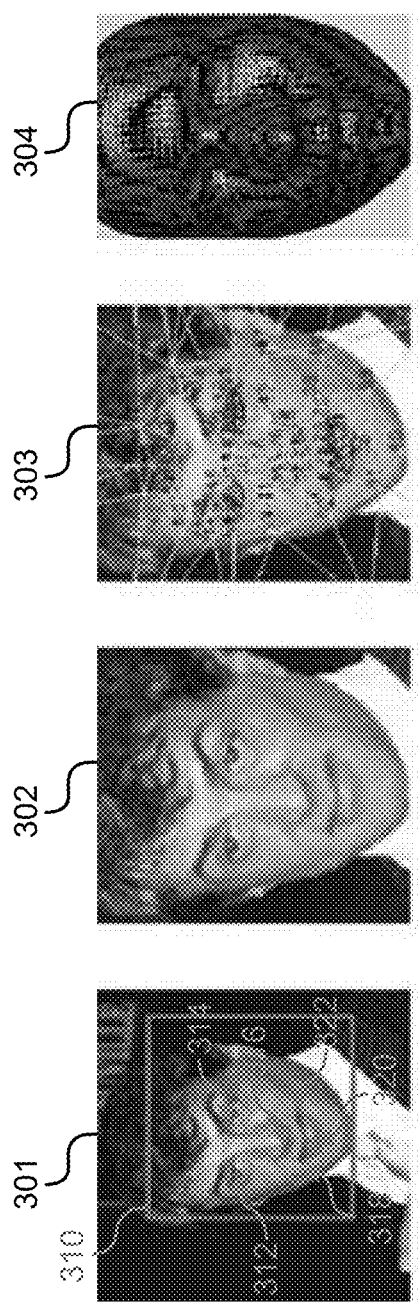
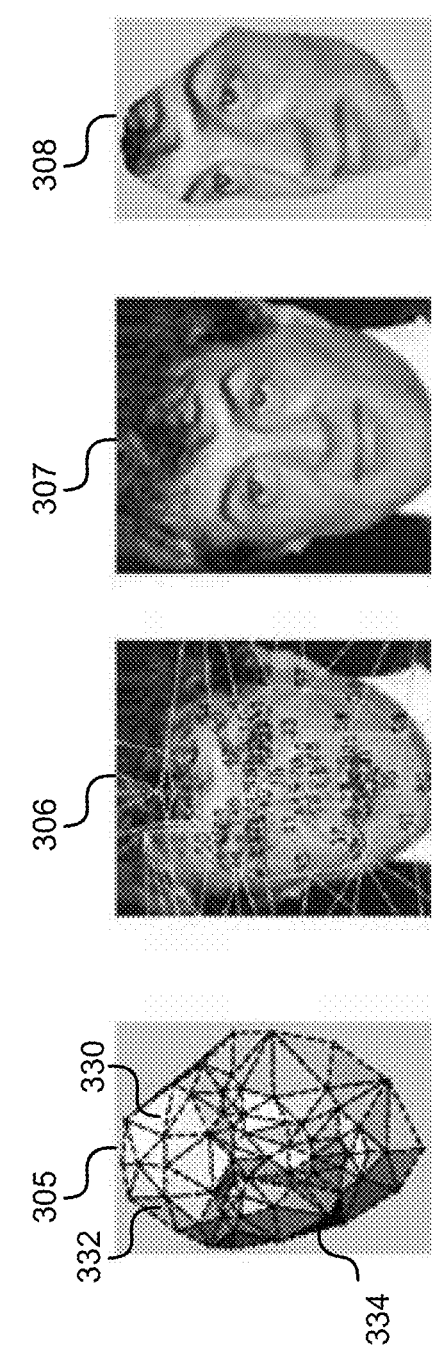
FIG. 3A FIG. 3B FIG. 3C FIG. 3D
FIG. 3E FIG. 3F FIG. 3G FIG. 3H Figure 4. The ROC curves on the *YTF* dataset.

SYSTEMS AND METHODS FOR FACIAL REPRESENTATION

CROSS-REFERENCE TO RELATED APPLICATIONS

This application is a continuation of U.S. patent application Ser. No. 14/530,585, filed on Oct. 31, 2014 and entitled "SYSTEMS AND METHODS FOR FACIAL REPRESENTATION", which claims the benefit of U.S. Provisional Application No. 61/899,877, filed on Nov. 4, 2013, which is hereby incorporated herein by reference in its entirety.

FIELD OF THE INVENTION

The present technology relates to the field of facial recognition. More particularly, the present technology provides techniques for representing facial images using deep learning.

BACKGROUND

A facial recognition system is a computer application that automatically identifies or verifies a person from an image or a video. Face recognition in unconstrained images is at the forefront of the algorithmic perception revolution. The social and cultural implications and advantages of face recognition technologies are far reaching. Yet the current performance gap in this domain between machines and the human visual system precludes realization of these advantages.

Face recognition error rates have decreased over the last twenty years by three orders of magnitude when recognizing frontal faces in still images taken in consistently controlled (constrained) environments. Applications include border-control and smart biometric identification. However, these systems can be sensitive to various factors, such as lighting, expression, occlusion, and aging. The performance of these systems can substantially deteriorate when attempting to recognize people in unconstrained settings.

SUMMARY

Various embodiments of the present disclosure can include systems, methods, and non-transitory computer readable media configured to align face images, classify face images, and verify face images by employing a deep neural network. In some embodiments, a 3D-aligned face image can be generated from a 2D face image. An identity of the 2D face image can be classified based on provision of the 3D-aligned face image to a deep neural network (DNN). The identity of the 2D face image can comprise a feature vector.

In one embodiment, a set of fiducial points of the 2D face image may be detected. The 2D face image may be used to warp the 2D face image to a 3D shape to generate the 3D aligned face image.

In one embodiment, a set of anchor points may be placed onto a 3D shape. Each anchor point may correspond to a fiducial point of a set of fiducial points of a 2D face image. A location of each fiducial point of the set of fiducial points of the 2D face image may be back-projected to the 3D shape. The location of each fiducial point of the set of fiducial points of the 2D face image may be projected to a frontal view of the 3D shape. The 2D face image may be transformed to the 3D-aligned face image based on the set of fiducial points and the set of anchor points.

In one embodiment, the set of fiducial points of the 2D face image define a set of triangles. Affine transformation is performed on each triangle of the set of triangles to transform the 2D face image to the 3D-aligned face image.

In one embodiment, a face portion of an image may be identified by detecting a second set of fiducial points of the image. The 2D face image may be generated by transforming the face portion of the image based on the second set of fiducial points.

In one embodiment, a set of anchor locations may be determined. The face portion of the image may be warped based on the set of anchor locations to generated the 2D face image.

In one embodiment, the DNN comprises a set of layers comprising a convolutional-pooling layer, a set of locally-connected layers, and a set of fully-connected layers.

In one embodiment, the convolutional-pooling layer comprises a first convolutional layer, a max-pooling layer, and a second convolutional layer. The convolutional-pooling layer is configured to extract a set of features of the 3D-aligned face image.

In one embodiment, each locally-connected layer of the set of locally-connected layers is configured to extract a set of features of the 3D-aligned face image.

In one embodiment, each fully-connected layer of the set of fully-connected layers is configured to determine correlations between a set of features of the 3D-aligned face image.

In one embodiment, an output of a fully-connected layer of the set of fully-connected layers is the feature vector.

In one embodiment, the DNN is configured to classify the 2D face image based on the feature vector. The feature vector comprises a set of features of the 3D-aligned face image. Each feature of the set of features is normalized to a predetermined range.

In one embodiment, the DNN is configured to define a set of filters for each pixel of the 3D-aligned face image.

In one embodiment, the DNN is trained to define the set of filters with a dataset.

In one embodiment, an individual of the 2D face image may be identified by querying the identity of the 2D face image in an image store. The image store comprises a set of face images and each face image of the set of face images corresponds to an individual.

In one embodiment, a second identity of a second 2D face image is classified. The identity may be compared to the second identity to determine whether the identity and the second identity correspond to an individual.

In one embodiment, a weighted-$\chi^2$ distance between the identity and the second identity may be determined to compare the identity to the second identity.

In one embodiment, the identity comprises a first set of features and the second identity comprises a second set of features. A set of feature differences between the first set of features and the second set of features may be determined. The set of feature differences may be mapped to a predetermined value by using a fully-connected layer to compare the identity to the second identity.

In a further embodiment according to the invention, one or more computer-readable non-transitory storage media embody software that is operable when executed to perform a method according to the invention or any of the above mentioned embodiments.

In a further embodiment according to the invention, a system comprises: one or more processors; and at least one memory coupled to the processors and comprising instructions executable by the processors, the processors operable when executing the instructions to perform a method according to the invention or any of the above mentioned embodiments.

In a further embodiment according to the invention, a computer program product, preferably comprising a computer-readable non-transitory storage media, is operable when executed on a data processing system to perform a method according to the invention or any of the above mentioned embodiments.

Many other features and embodiments of the invention will be apparent from the following detailed description and from the accompanying drawings.

Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof is disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIG. 3A illustrates an example 2D image comprising a detected face portion with fiducial points, according to an embodiment of the present disclosure.

FIG. 3B illustrates an example 2D face image generated based on the example 2D image illustrated in FIG. 3A, according to an embodiment of the present disclosure.

FIG. 3C illustrates an example 2D face image with fiducial points detected as well as corresponding triangles defined by the fiducial points, according to an embodiment of the present disclosure.

FIG. 3D illustrates an example 3D shape converted to the image plane of the 2D face image illustrated in FIG. 3B, according to an embodiment of the present disclosure.

FIG. 3E illustrates triangles visibility with respect to a fitted 3D-2D camera, according to an embodiment of the present disclosure.

FIG. 3F illustrates anchor points placed on the 3D shape corresponding to the fiducial points illustrated in FIG. 3C, according to an embodiment of the present disclosure.

FIG. 3G illustrates an example 3D-aligned face image, according to an embodiment of the present disclosure.

FIG. 3H illustrates an example view of the face generated based on the 3D face image illustrated in FIG. 3G, according to an embodiment of the present disclosure.

Figure 1:
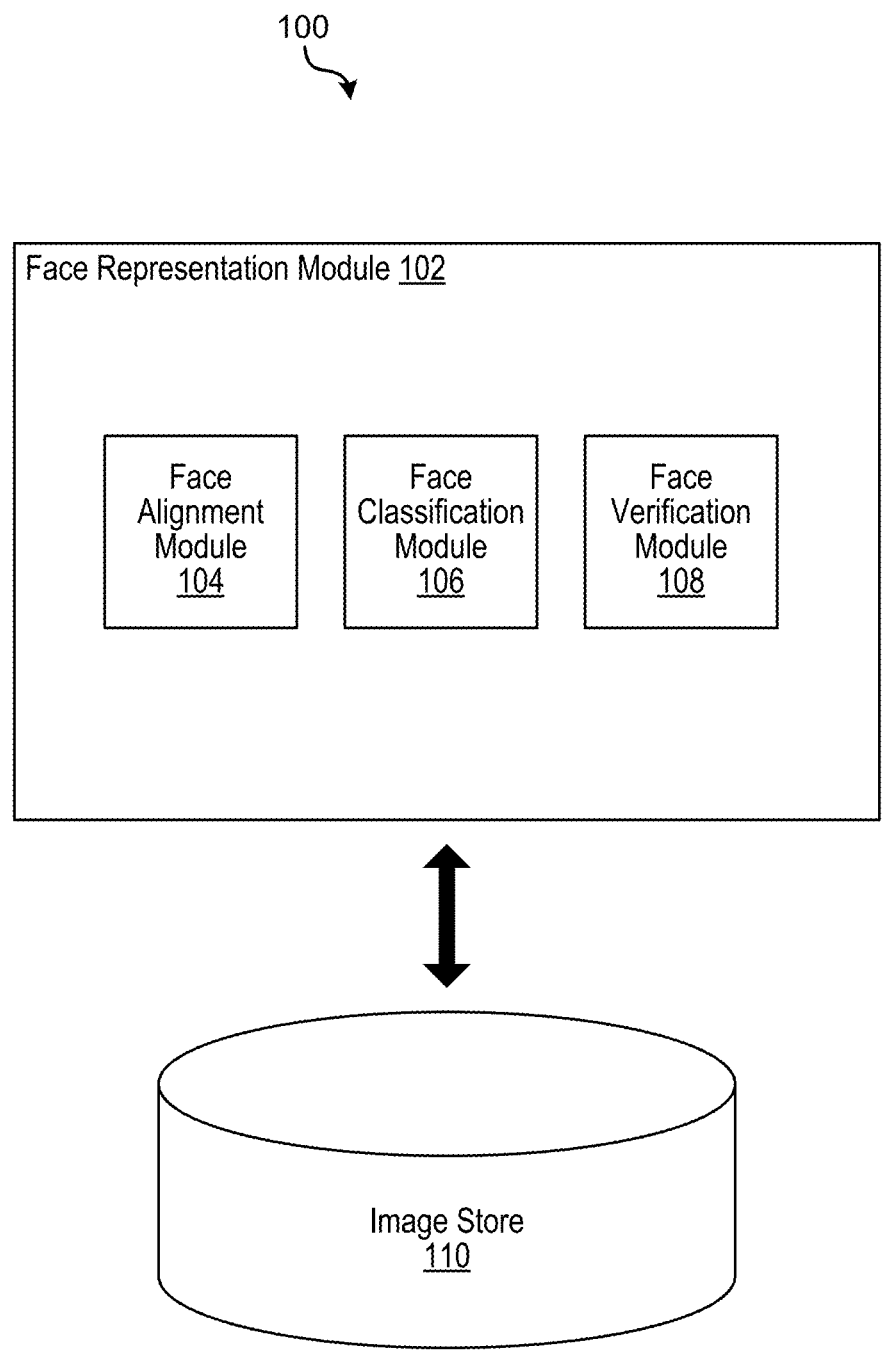
FIG. 1 illustrates an example system including an example face representation module configured to align face images, classify face images, and/or verify face images by employing a deep neural network, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

In recent years, a large number of photos have been crawled by search engines, and uploaded to social networks. These photos may include a variety of unconstrained materials, such as objects, faces, and scenes. Being able to leverage this immense volume of data is of great interest to the computer vision community in dealing with its unsolved problems. However, the generalization capability of many of the conventional machine-learning tools used in computer vision, such as Support Vector Machines, Principal Component Analysis and Linear Discriminant Analysis, tends to saturate rather quickly as the volume of the training set grows significantly.

Modern face recognition may comprise several stages such as detection, alignment, representation, and classification. One or more faces may be detected from an image during the detection stage, and the detected faces are aligned in the alignment stage. Subsequently, each face in the image is represented during the representation stage. Each face in the image may be classified in the classification stage. Conventional face verification methods use hand-crafted features defined and selected by users. The hand-crafted features may be combined to improve performance, even in the earliest Labeled Faces in the Wild ("LFW") contributions. These systems may employ tens of thousands of image descriptors.

Face alignment locates semantic facial landmarks such as eyes, nose, mouth, and chin. As a result, face alignment may be a crucial part of face recognition systems. Face databases that include datasets of aligned faces (e.g., LFW-a) may improve performances of face recognition systems by providing a normalized input. Some of the contributions on the LFW results page use a 2D aligned version of the dataset (e.g., LFW-a) and have improved results. Other contributions may employ more customized solutions. For example, a dataset of individuals with similar poses and expressions to infer plausible "identity preserving" alignment is used. Nevertheless, aligning faces in the unconstrained scenario may be challenging. Due to the non-planarity of the face, many factors (e.g., poses and non-rigid expressions) that are hard to decouple from a person's identity baring facial morphology, need to be accounted for.

FIG. 1 illustrates an example system 100 including an example face representation module 102 configured to align face images, classify face images, and/or verify face images by employing a deep neural network, according to an embodiment of the present disclosure. As shown in FIG. 1, the example face representation module 102 may comprise a face alignment module 104, a face classification module 106, and a face verification module 108.

The example system 100 may include at least one image store 110. In the example of FIG. 1, the at least one image store 110 may be configured to store images or other digital media such as videos. Images may include facial images that are identified or unidentified. A facial image that is identified may be linked to a person, whereas a facial image that is unidentified is not linked to any person. For example, a facial image that is identified may be tagged with a person's ID (e.g., name, user name, etc.) An image may be 2D or 3D. In various embodiments, raw images may be used as the underlying representation. The image store 110 may store datasets, which may be used to train a deep neural network ("DNN") to learn and classify face representations. Various embodiments may provide a deep neural network architecture and a learning method that leverages a very large labeled dataset of faces in order to obtain a face representation that generalizes well to other datasets. The DNN may involve, for example, more than 120 million parameters using several locally connected layers without weight sharing. For example, a dataset may comprise four million facial images belonging to more than 4,000 identities, where each identity has an average of over a thousand samples of a person.

In some embodiments, the face alignment module 104 may be configured to include an analytical 3D modeling of the face based on fiducial points. The face alignment module 104 may be further configured to warp a detected facial crop based on the analytical 3D model thereby creating a 3D aligned face image. As the location of each facial region is fixed at the pixel level among 3D aligned face images, facial appearance may be learned and detected from RGB values of a pixel in raw images.

In some embodiments, the face classification module 106 may be configured to classify an identity of an image. The face classification module 106 may be configured to classify an identity (e.g., face representation) of an image directly based on RGB values of a pixel of the image. The identity of the image may be very compact and even sparse. In further embodiments, the identity of the image may be created based on RGB values of a pixel, a gradient domain, a depth map, or depth information of the image, or any combination thereof.

In some embodiments, the face verification module 108 may be configured to verify whether two images have the same identities. In other words, whether two images belong to the same class is verified. The face verification module 108 may be configured to determine the similarity between two images based on identities (e.g., face representations of images) classified by the face classification module 106.

Images may be represented by feature vectors. In some embodiments, the similarity of the two images may be determined by calculating the inner product between the two normalized feature vectors for two images. In some embodiments, the similarity of the two images may be determined by a supervised metric such as the $\chi^2$ similarity or the Siamese network.

The weighted-$\chi^2$ similarity between two images may be represented as: $\chi^2(f_1,f_2)=\Sigma_i\ w_i(f_1(i)-f_2(i))^2/(f_1(i)+f_2(i))$, where $f_1$ and $f_2$ are the feature vector representations of the images, respectively. The weight parameters may be learned using a linear SVM, applied to vectors of the elements $(f_1(i)-f_2(i))^2/(f_1(i)+f_2(i))$.

A Siamese network provides a highly non-linear metric for two images. The absolute difference between the features identified for the two images may be determined and used to directly predict whether the two input images belong to the same person. The induced distance between the features for two images may be represented as: $d(f_1,f_2)=\Sigma_i a_i|f_1(i)-f_2(i)|$, where $a_i$ are trainable parameters of a Siamese network. The parameters of the Siamese network (the $a_i$ as well as the joint parameters in the lower layers) may be trained by normalizing the distance between 0 and 1 via a logistic function: $1/(1+\exp(-d))$, and by using a cross-entropy loss and back-propagation. In various embodiments, in order to prevent overfitting on the face verification task, training is only enabled for the two topmost layers of a Siamese network.

Figure 2:
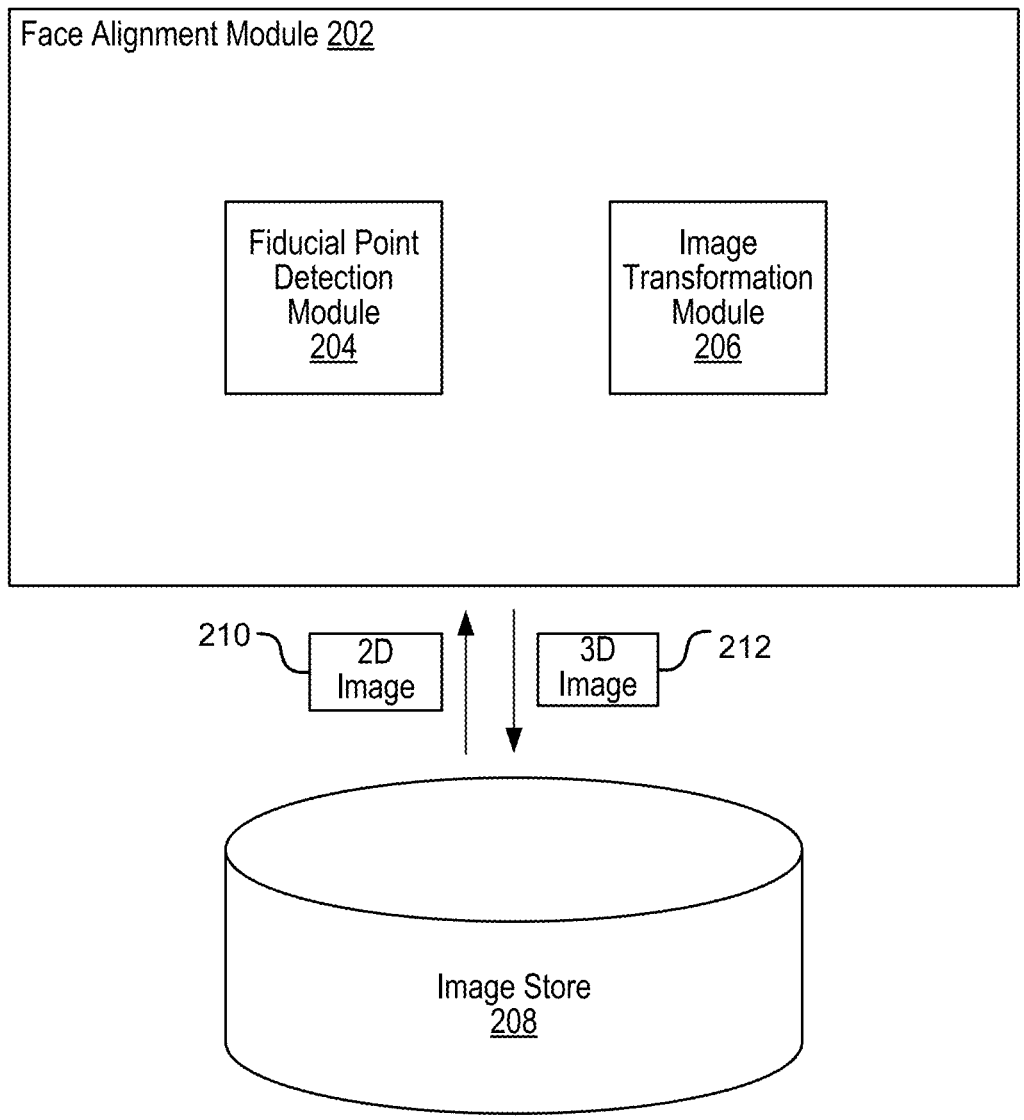
FIG. 2 illustrates an example face alignment module, according to an embodiment of the present disclosure.

FIG. 2 illustrates an example face alignment module 202, as shown in FIG. 1 (e.g., the face alignment module 104), according to an embodiment of the present disclosure. The example face alignment module 202 may align facial images. Images to be aligned may be obtained from at least one data store 208 (e.g., the image store 110 in FIG. 1). Aligned facial images may be stored in the data store 208. FIG. 2 is discussed in connection with FIGS. 3A-3H.

FIGS. 3A-3H illustrate example image data during different times of an alignment process, according to an embodiment of the present disclosure. FIG. 3A illustrates an example 2D image 301 comprising a detected face portion 310 with fiducial points. FIG. 3B illustrates an example 2D face image 302 generated based on the example 2D image 301 illustrated in FIG. 3A. FIG. 3C illustrates an example 2D face image 303 with fiducial points detected as well as corresponding triangles defined by the fiducial points. FIG. 3D illustrates an example 3D shape 304 converted to the image plane of the 2D face image 302 illustrated in FIG. 3B. FIG. 3E illustrates triangles visibility with respect to a fitted 3D-2D camera. FIG. 3F illustrates anchor points placed on the 3D shape 306 corresponding to the fiducial points illustrated in FIG. 3C. FIG. 3G illustrates an example 3D-aligned face image 307. FIG. 3H illustrates an example view of the face 308 generated based on the 3D face image 307 illustrated in FIG. 3G.

The face alignment module 202 may comprise a fiducial point detection module 204 and an image transformation module 206. The face alignment module may be configured to align a 2D image 210 to a 3D aligned face image 212. The 3D aligned face image 212 may be aligned in an unconstrained scenario such that many factors that are hard to decouple from a person's identity baring facial morphology, may be taken into account. For example, poses that are due to the non-planarity of the face and non-rigid expressions are considered.

The fiducial point detection module 204 localizes fiducial points in the 2D face image. The 2D face image may be an unconstrained image. In various embodiments, fiducial points may be extracted by a Support Vector Regressor (SVR). The SVR may be trained to predict point configurations from an image descriptor of the 2D face image. In various embodiments, the image descriptor is based on Local Binary Patterns ("LBP") Histograms. In further embodiments, other features may be considered in the image descriptor. In some embodiments, multiple iterations may be applied such that the fiducial point detection module 204 may refine its output. That is, the fiducial point detection module 204 may be configured to detect an initial set of fiducial points, which may be refined over multiple iterations to a final set of fiducial points. A 2D face image may be transformed using the induced similarity matrix T to a 2D transformed image. The fiducial point detection module 204 may analyze the 2D transformed image on a new feature space, which may be used to refine the localization of fiducial points of the 2D face image.

The fiducial point detection module 204 may be configured to detect a set of fiducial points of a 2D face image. Referring to FIG. 3C, an example 2D face image 303 with a set of fiducial points is illustrated. The set of fiducial points $x_{2d}$ are detected from the 2D face image 302 illustrated in FIG. 3B, which is a 2D-aligned crop image of the 2D image 301 illustrated in FIG. 3A. The set of fiducial points $x_{2d}$ may be detected by using a trained SVR. In the illustrated example, a selected number (e.g., 67) of fiducial points are localized on the 2D face image 303. The set of fiducial points $x_{2d}$ may define a set of corresponding triangles (e.g., Delaunay triangulation), which may be added on the contour of the image illustrated in the 2D face image 303. As such, cropping and sharp edges may be avoided.

Referring back to FIG. 2, the image transformation module 206 may be configured to generate the 3D-aligned face image 212 by warping the 2D face image to a 3D shape by using the set of fiducial points detected by the fiducial point detection module 204. Referring to FIG. 3G, an example 3D aligned face image 307 is illustrated, which is created based on the 2D face image 302 illustrated in FIG. 3B. The 2D face image 302 may be warped using the set of fiducial points illustrated in FIG. 3C to generate the 3D aligned face image 307 illustrated in FIG. 3G. When warping a 2D face image to a 3D shape or model, the location of each fiducial point from the 2D face image is back-projected to the 3D shape or model through a recovered projection matrix P, and subsequently projected to a frontal view of the 3D shape or model. In various embodiments, a piecewise affine transformation is used, directed by the triangles (e.g., Delaunay triangulation) derived from the set of fiducial points detected on the 2D face image.

Referring to FIG. 3D, an example 3D shape or model 304 converted to the image plane of the 2D-face image 302 is illustrated. A generic 3D shape or model may be used as a reference to align the face image 302 that contains outer-plane rotations. In various embodiments, the generic 3D shape model is the average of the 3D scans from the USF Human-ID database. The average of the 3D scans may be processed and represented as aligned vertices $v_i=(x_i, y_i, z_i)^n_{i=1}$.

A set of anchor points $X_{3d}$ may be placed on the 3D shape. Each anchor point corresponds to a fiducial point detected on the 2D face-image. Full matching between the fiducial points detected on the 2D-face image and the anchor points on the 3D-aligned face image may be achieved. For example, FIG. 3F illustrates anchor points that may be induced by a 3D shape or model. Each of the anchor points illustrated in FIG. 3F corresponds to a fiducial point illustrated in FIG. 3C. The fiducial points and the anchor points may be used to direct the piece-wise affine warping of the 2D face image illustrated in FIG. 3B to the 3D-aligned face image illustrated in FIG. 3G.

A 3D affine camera P may be registered and used to back-project the frontal face plane of the 2D-face image 302 illustrated in FIG. 3B to the image plane of a 3D shape 304 illustrated in FIG. 3D. As such, the reference 3D shape 304 is converted to the image plane of the 2D face image 302. In other words, the 2D face image 302 is transformed to a 3D-aligned face image based on the reference 3D shape 304. The affine 3D-to-2D camera P may be solved using least squares with a known covariance, for $x_{2d}=X_{3d}\vec{P}$, where $X_{3d}$ are (2×8)-matrix stacks given by the reference fiducial points location $[x^T_{3d}, 1, \vec{0}; \vec{0}, x^T_{3d}, 1]$, with $\vec{0}$ denoting a row vector of four zeros. The affine camera P of size 2×4 may be represented by a vector of eight unknowns $\vec{P}$. In some embodiments, a (67*2)×(67*2) covariance matrix Σ is used, which is given by the estimated covariances of the fiducial point errors. This is because detected points on the contour of the face may be more noisy as their estimated locations may be affected by the depth with respect to the camera angle.

FIG. 3E illustrates triangles visibility with respect to a fitted affine 3D-to-2D camera. Visibility of triangles on the 3D shape or model may depend on the distance of the corresponding anchor points which define the triangles from the affine 3D-to-2D camera. Depending on the distance from the camera for fiducial points, the triangle 334 is less visible than the triangle 332, which is less visible than the triangle 330.

Referring back to FIG. 2, in various embodiments, the face alignment module 202 may be configured to generate a 2D face image from a 2D image 210. Referring to FIG. 3A, a face portion 310 is detected in a 2D image 301. The face portion 310 of the 2D image 301 may be identified by detecting a set of fiducial points 312, 314, 316, 318, 320, and 322. The fiducial points 312, 314 may be centered at the center of the eyes, the fiducial point 316 may be centered on the tip of the nose, and the fiducial points 318, 322, and 320 may be centered at the tips and the mid-point of the mouth, respectively. The fiducial points detected in a face portion may be used to determine a set of anchor locations. The face portion identified may be warped based on the set of anchor locations to generate the 2D face image. For example, as illustrated, the fiducial points 312, 314, 316, 318, 320, and 322 may be used to approximately scale, rotate and translate the face portion 310 into three anchor locations. The three anchor locations may be determined by solving for $T^i_{2d}:=(s_i, R_i, t_i)$ where: $x^j_{anchor}:=s_i[R_i|t_i]*x^i_{source}$ for points j=1 . . . n to generate a new warped image as illustrated in FIG. 3B. FIG. 3B illustrates a 2D face image 302. The 2D face image 302 may be an aligned face crop generated by an aggregated transformation based on the 2D image 301. Multiple iterations may be performed to determine the anchor locations thereby generating the 2D face image 302 based on the detected face portion 310 until there is no substantial change. The final 2D similarity transformation $T_{2d}:=T^l_{2d}* \ldots *T^k_{2d}$ may be composed.

Figure 4:
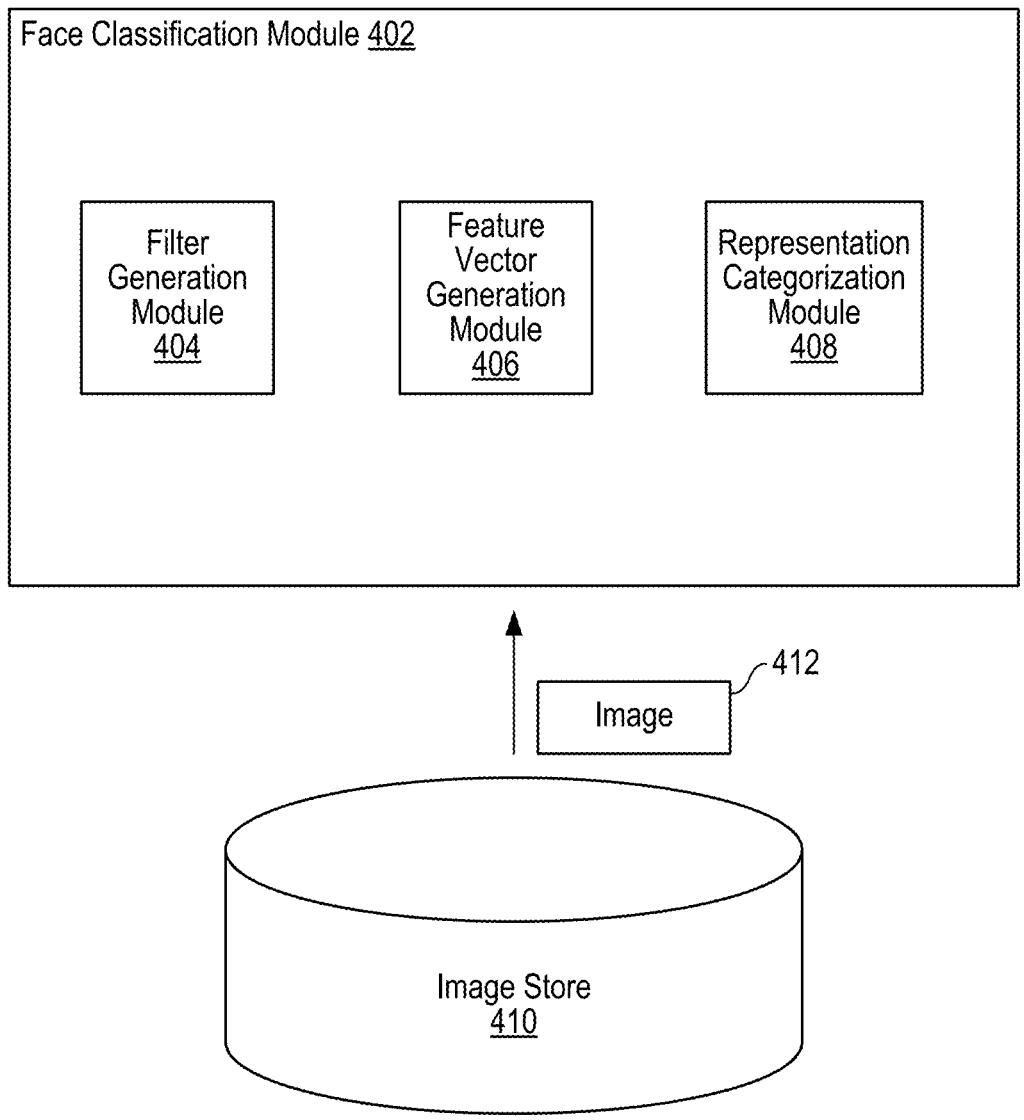
FIG. 4 illustrates an example face classification module, according to an embodiment of the present disclosure.

FIG. 4 illustrates an example face classification module 402, as shown in FIG. 1 (e.g., the face classification module 106), according to an embodiment of the present disclosure. The example face classification module 402 may classify the identity of an image 412. Images to be classified may be obtained from at least one data store 410 (e.g., the image store 110 in FIG. 1). Classified images may be stored in the data store 410. FIG. 4 is discussed in connection with FIG. 5.

The face classification module 402 may comprise a filter generation module 404, a feature vector generation module 406, and a representation categorization module 408. The face classification module 402 may be configured to derive an identity (e.g., face representation) of an image from a DNN. The filter generation module 404 may be configured to generate a set of filters by training a DNN with datasets. In various embodiments, datasets may include a large collection of photos. Some of the photos may be identified (e.g., labeled or tagged with IDs). Each filter may be configured to extract a feature (e.g., facial feature) of an image. The feature vector generation module 406 may be configured to generate a feature vector of an image. The feature vector includes various features of the image and may be used to represent the image. The feature vector of an image may be generated based on the set of filters provided by the filter generation module 404. The representation categorization module 408 may categorize an image based on the feature vector of the image.

In various embodiments, a DNN may comprise a set of layers including a convolutional-pooling layer, a locally-connected layer, and a fully-connected layer. The convolutional-pooling layer may be configured to extract a set of features of an image. The locally-connected layer may be configured to extract another set of features of an image. The fully-connected layer may be configured to determine correlations between features of an image. In some embodiments, the overall architecture of the DNN includes a convolutional-pooling layer, followed by a set of locally-connected layers, which are followed by a fully-connected layer. The DNN may comprise at least a selected number of (e.g., 120 million) parameters (e.g., connection weights). In various embodiments, the DNN is configured to receive as inputs 3D-aligned face images, such as the 3D-aligned face image 307 illustrated FIG. 3G.

In various embodiments, the DNN uses the ReLU activation function: max(0, x). This soft-thresholding non-linearity may be applied after a convolution layer, a locally-connected layer, or a fully-connected layer except for the last fully-connected layer of a DNN. As such, highly non-linear and sparse features may be produced. Accordingly, features produced by the face classification module 402 may be very sparse. In some embodiments, on average, 75% of the feature components in the topmost layers are exactly zero. In further embodiments, a regularization method (e.g., dropout) that sets random feature components to 0 during training may be applied. In some embodiments, the regularization method is only applied to the first fully-connected layer. The use of ReLU activation allows the face classification module 402 to be not invariant to scaling of the image intensity. Without biases in the DNN, perfect or near perfect equivariance may be achieved.

In some embodiments, the face classification module 402 may be configured to normalize the features to be between zero and one. The face classification module 402 may be further configured to perform $L_2$-normalization. As such, subsequent learning may be improved. Each component of the feature vector may be divided by its largest value across the training set. In some embodiments, in order to avoid division by a small number, the normalization factor is capped at a predetermined value (e.g., 0.05.) If the maximum number is lower than the predetermined value (e.g., 0.05), the feature is not normalized. Such normalization may ensure the face classification module 402 to be robust to illumination changes.

In various embodiments, an input 3D-aligned face image may be provided to a convolutional-pooling layer of a DNN. The convolutional-pooling layer may comprise a first convolutional layer (C1), a max-pooling layer (M2), and a second convolutional layer (C3). Each convolutional layer may be configured to comprise a set of filters, each of which is configured to generate a feature map. The max-pooling layer may make a DNN more robust to small registration errors. However, several levels of pooling would cause the network to lose information about the precise position of detailed facial structure and micro-textures. As such, in various embodiments, max-pooling is applied only to the first convolutional layer. That is, only the first convolutional layer is followed by a max-pooling layer. The convolutional-pooling layer is configured to extract low-level features (e.g., simple edges and texture) of an image. The convolutional-pooling layer adaptively pre-processes an input image and expands the input image into a set of simple local features.

Figure 5:
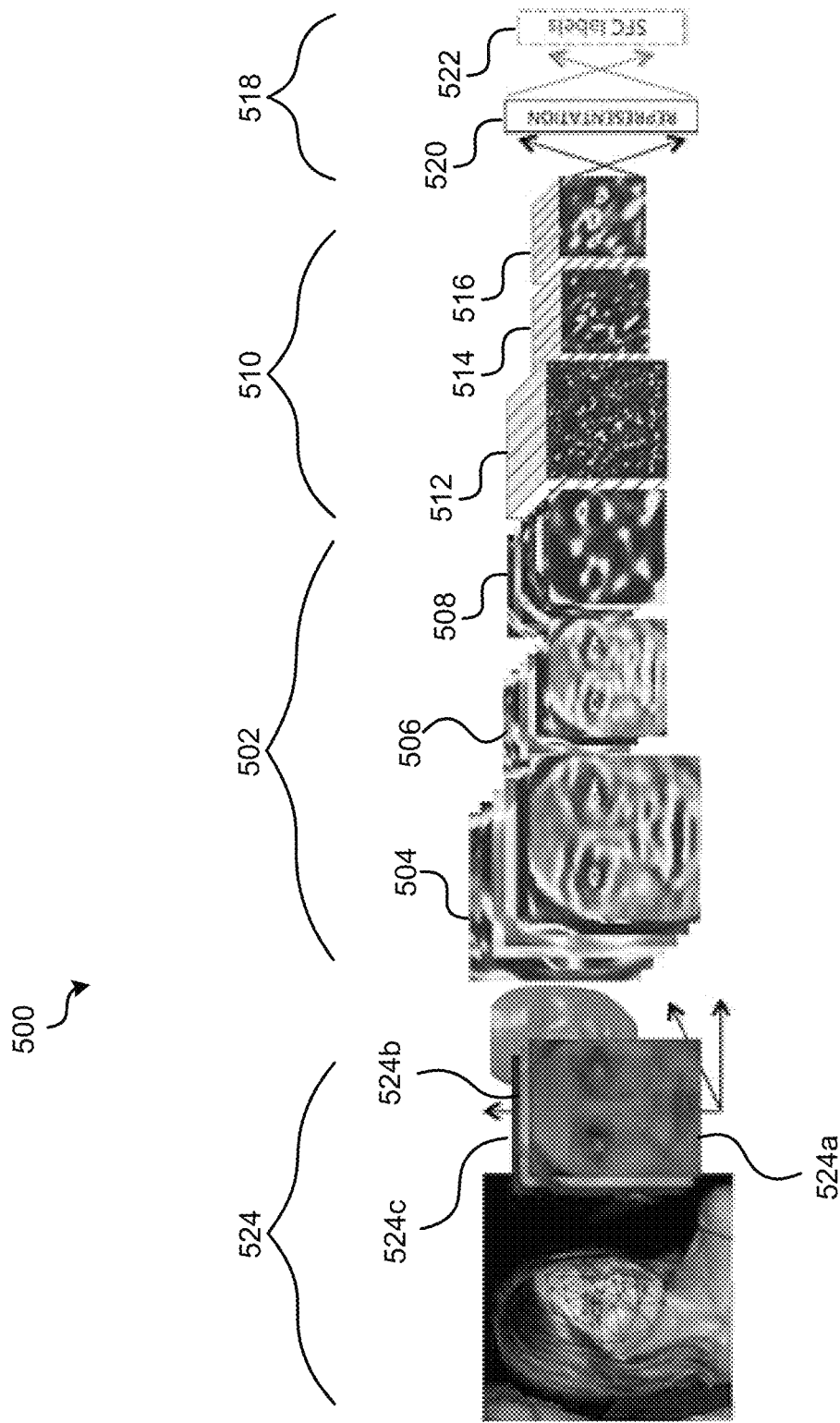
FIG. 5 illustrates an example architecture of an example DNN, according to an embodiment of the present disclosure.

FIG. 5 illustrates an example architecture 500 of an example DNN according to an embodiment of the present disclosure. A 3D-aligned face image 524 (including RGB copies 524a-c) is provided as an input to the DNN 500. In the illustrated example, the DNN 500 may classify the identity of the 3D-aligned face image 514 based on the RGB values of the pixels. Local facial features of the image 524 may be extracted by the convolutional-pooling layer 502 and the set of locally-connected layers 510. Correlations between local facial features of the image 524 may be determined by the set of fully-connected layers 518. In the illustrated example, the output of the fully-connected layer F7 520 may be used as the feature vector of the image 524.

As illustrated, the example convolutional-pooling layer 502 comprises a convolutional layer C1 504, a max-pooling layer M2 506, and a convolutional layer C3 508. The convolutional layer may be configured to have a set of filters (e.g., 32 filters). In one embodiment, each filter of the selected number of filters may be of size 11×11×3. The set of feature maps generated by the convolutional layer C1 may be provided to the max-pooling layer M2. For each channel, the max-pooling layer M2 may be configured to take the max over 3×3 spatial neighborhoods with a stride of 2. The second convolutional layer C3 may be applied to the output of the max-pooling layer M2. The convolutional layer C3 may be configured to have a set of filters (e.g., 16 filters). In one embodiment, each filter of the selected number of filters may be of size 9×9×16.

Features (e.g., local facial features) of an image generated by a convolutional-pooling layer may be provided to a set of locally-connected layers. The set of locally-connected layers has no weight sharing and each output of a locally-connected layer may be affected by a very large patch of the input. As such, the use of locally-connected layers may not affect the computational burden of feature extraction, but may affect the number of parameters subject to training. Each locally-connected layer may be configured to extract a set of features from the input image. For the same location of an image, different features may be extracted by a locally-connected layer and a convolutional layer. That is, a set of filters in every location in the feature map is learned by a locally-connected layer of a DNN, and this set of filters is different from the set of filters learned by a convolutional layer. A locally-connected layer does not hold the spatial stationarity assumption of convolution because different regions of aligned image may have different local statistics. For example, areas between the eyes and the eyebrows exhibit very different appearance and have much higher discrimination ability compared to areas between the nose and the mouth.

Still referring to FIG. 5, as illustrated, the example set of locally-connected layers 510 comprises a first locally-connected layer L4 512, a second locally-connected layer L5 514, and a third locally-connected layer L6 516. At every location in a feature map of an input image to the illustrated example DNN 500, a locally-connected layer L4 512, L5 514, or L6 516 may apply a different set of filters from the set applied by a convolutional layer C1 504 or C3 508. Each output unit of a locally-connected layer L4 512, L5 514, or L6 516 may be affected by a very large patch of the input. For example, as illustrated, the output of the locally-connected layer L6 516 may be influenced by a 74×74×3 patch of the input image 524. Because the input image 524 is aligned, there is hardly any statistical sharing between such large patches.

Local facial features of an image generated by a convolutional-pooling layer and a set of locally-connected layers may be provided to a set of fully-connected layers. The set of fully-connected layers is configured to determine correlations between the local facial features of the image generated by the convolutional-pooling layer and the set of locally-connected layers. That is, the set of fully-connected layers is configured to determine correlations between the local facial features extracted in distant parts of the face images (e.g., positions and shapes of eyes, the position and shape of a mouth). Each output of a fully-connected layer may be connected to all inputs of the fully-connected layer.

Referring to FIG. 4, in some embodiments, the feature vector generation module 406 is configured to use the output of a fully-connected layer as the feature vector of the image 410. The representation categorization module 408 may be configured to categorize an image to a class based on the feature vector. In some embodiments, the output of the DNN (e.g., the output of the last fully-connected layer) may be provided to a K-way softmax, where K is the number of classes. The K-way softmax may be configured to produce a distribution over the class labels. The probability assigned to the i-th class is the output of the softmax function: $p_i = \exp(o_i)/\Sigma_j \exp(o_j)$, where $o_i$ denotes the i-th output of the network on a given input. The representation categorization module 408 may be configured to identify the individual to which a 2D face image belongs. The image store 410 may be queried with the identity (e.g., face representation, feature vector) of the 2D face image.

In various embodiments, when training a DNN, the probability of the correct class (e.g., a face ID) is maximized. The cross-entropy loss for each training sample may be minimized in order to maximize the probability of the correct class. The cross-entropy loss for a given input is $L = -\log p_k$, where k is the index of the true label for a given input. The loss may be minimized over the parameters by computing the gradient of L with respect to the parameters and by updating the parameters using stochastic gradient descent (SGD). In some embodiments, the gradients may be determined by standard back-propagation of the error.

The architecture of the DNN 500 may be customized by leveraging the fact that the input images are aligned. The example DNN 500 may be configured to learn different filters corresponding to various facial features, to detect various facial features, and/or to generate a feature vector of an image (as described in more details above). As illustrated in FIG. 5, the example DNN 500 is a nine-layer DNN that comprises a convolutional-pooling layer 502, a set of locally-connected layers 510, and a set of fully-connected layers 518. The convolutional-pooling layer 502 may comprise a convolution layer C1 504, a max pooling layer M2 506, and a convolution layer C3 508. The set of locally-connected layers 510 may comprise locally-connected layers L4-L6 512, 514, and 516, and the set of fully-connected layers 518 may comprise fully-connected layers F7-F8 520 and 522. Each output unit of the fully-connected layer F7 520 or F8 522 may be connected to all inputs.

Figure 6:
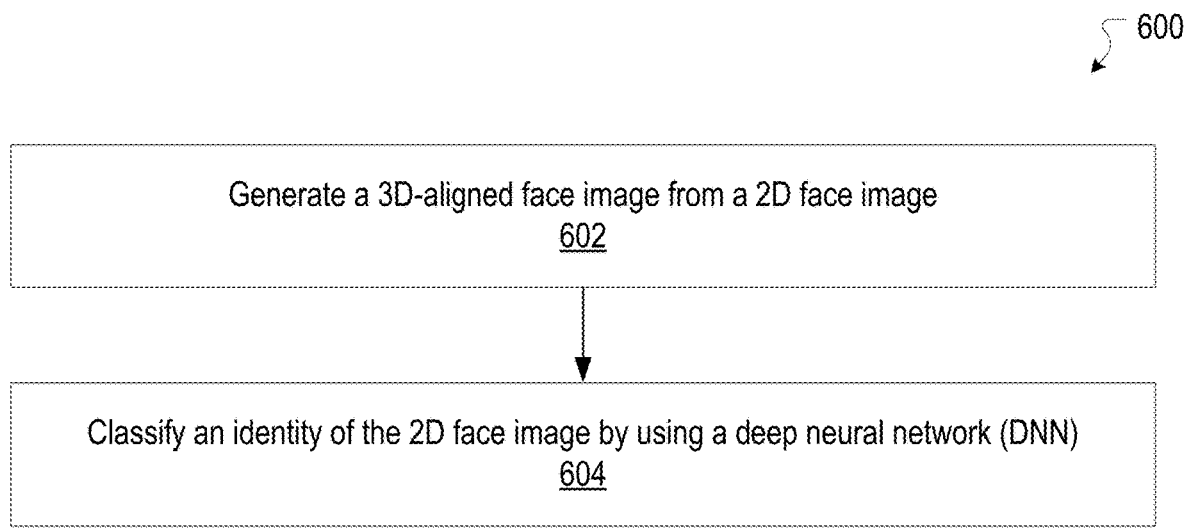
FIG. 6 illustrates an example method of generating a face representation for a 2D face image, according to an embodiment of the present disclosure.

FIG. 6 illustrates an example method of generating a face representation for a 2D face image, according to an embodiment of the present disclosure. It should be appreciated that there can be additional, fewer, or alternative steps performed in similar or alternative orders, or in parallel, within the scope of the various embodiments unless otherwise stated. At block 602, a 3D-aligned face image is generated based on a 2D face image. The 3D-aligned face image may be created by applying an affine transformation of the 2D face image based on a 3D model. The 3D model may be an explicit 3D face modeling. At block 604, the identity of the 2D face image may be classified by providing the 3D-aligned face image to a DNN. A face representation (e.g., a feature vector) of a 2D face image may be generated by using the 3D-aligned face image corresponding to the 2D face image. In some embodiments, the DNN may comprise nine layers. The DNN may involve, for example, more than 120 million parameters using multiple locally-connected layers without weight sharing. More detailed discussions and examples are provided above with reference to FIGS. 1-5.

Figure 7:
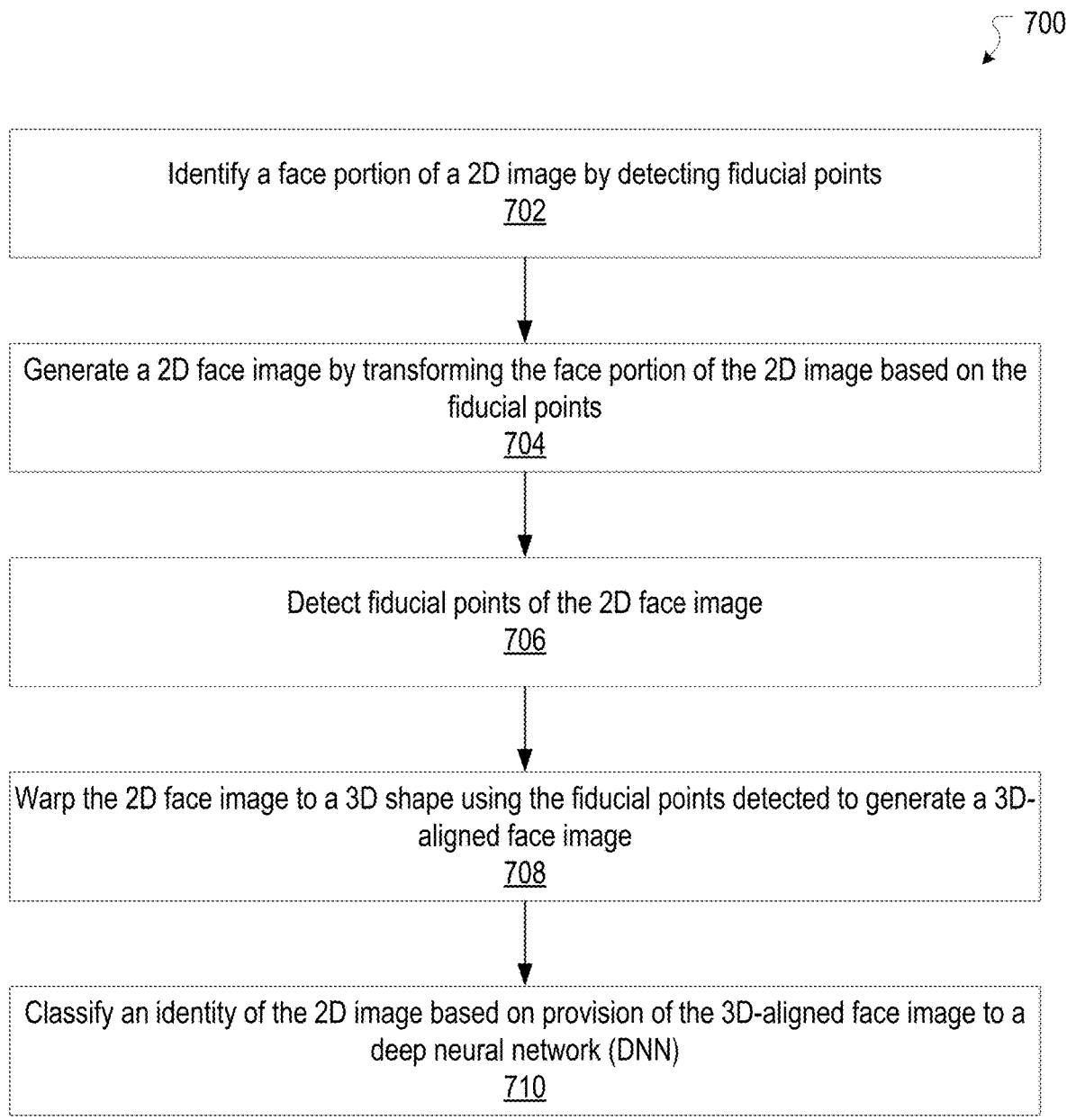
FIG. 7 illustrates an example method of generating a face representation for a 2D face image, according to an embodiment of the present disclosure.

FIG. 7 illustrates an example method of generating a face representation for a 2D face image, according to an embodiment of the present disclosure. It should be appreciated that there can be additional, fewer, or alternative steps performed in similar or alternative orders, or in parallel, within the scope of the various embodiments unless otherwise stated. At block 702, a face portion in a 2D image is identified by detecting a set of fiducial points on the 2D image. The fiducial points may be detected by a SVR trained to predict point configurations from an image descriptor. At block 704, a 2D face image may be generated by transforming the face portion of the 2D image based on the fiducial points detected at block 702. The 2D face image may be an aligned crop of the 2D image and may be generated by an aggregated transformation. The fiducial points may be used to scale, rotate, and translate the face portion of the 2D image and iterate on the new image warped image until there is no substantial change, when the 2D similarity transformation is eventually composed.

At block 706, a different set of fiducial points may be detected in the 2D face image. The fiducial points may be localized by using a SVR different from the SVR used at block 702. At block 708, the 2D face image may be warped to a 3D shape by using the fiducial points detected at block 706 to generate a 3D-aligned face image. The 3D shape may be a generic 3D model. A 3D affine camera may be registered, which is used to back-project the frontal face plane of the 2D face image to the image plane of the 3D shape thereby generating the 3D-aligned face image. At block 710, the identity of the 2D face image may be classified by providing the 3D-aligned face image to a deep neural network ("DNN"). More detailed discussions and examples are provided above with reference to FIGS. 1-5.

In various embodiments, the DNN is configured to learn face representations from a large collection of photos referred to as the Social Face Classification ("SFC") dataset. The representations may be applied to the LFW database and the YouTube® Faces ("YTF") dataset. The LFW database may be used as the de facto benchmark dataset for face verification in unconstrained environments. The YTF dataset may be modeled similarly to the LFW but focuses on video clips. The face identities in SFC were labeled by humans, which typically incorporate about 3% errors. Social face photos have even larger variations in image quality, lighting, and expressions than the web images of celebrities in the LFW and YTF which were normally taken by professional photographers rather than smartphones.

The SFC dataset, as used, includes 4.4 million labeled faces from 4,030 people. Each individual may have images of 800 to 1200 faces. The most recent 5% of face images of each identity may be left out. The LFW dataset, as used, consists of 13,323 web photos of 5,749 celebrities which are divided into 6,000 face pairs in 10 splits. Performance is measured by the mean recognition accuracy using the restricted protocol, in which only the 'same' and 'not same' labels are available in training, or the unrestricted protocol, where the training subject identities are also accessible in training. In addition, an 'unsupervised' protocol may measure performance on the LFW without any training on this dataset.

The YTF dataset, as used, collects 3,425 YouTube® videos of 1,595 subjects, which may be a subset of the celebrities in the LFW. These videos may be divided into 5,000 video pairs and 10 splits and used to evaluate the video-level face verification.

A DNN may be trained on the SFC by implementing the standard back-propagation on feed-forward nets by stochastic gradient descent (SGD) with momentum (set to 0.9). The mini-batch size is 128, and an equal learning rate is ensured for all learning layers to 0.01. The learning rate may be manually decreased to a final rate of 0.00001. Each time, the learning rate may be reduced by an order of magnitude once the validation error stopped decreasing. The weights in each layer may be initialized from a zero-mean Gaussian distribution with o=0.01, and biases set to 0.5. The network may be trained for roughly 15 sweeps (epochs) over the whole data.

Table 1 illustrates classification error of embodiments on the SFC with respect to training dataset size and network depth. Training and test dataset size was varied by using a subset of the individuals in the SFC. Subsets of sizes 1.5K, 3K, and 4K individuals are used for SFC comprising 1.5M, 3.3M, and 4.4M faces, respectively. DNNs (e.g., DeepFace-1.5M, DeepFace-3.3M, and DeepFace-4.4M) are trained. As illustrated, a large-scale face dataset and a deep architecture reduce the error rate. The classification error grows only modestly from 7.0% on 1.5K persons to 7.2% when classifying 3K persons, which indicates that the capacity of the network can well accommodate the scale of 3M training images. The error rate rises to 8.7% for 4K persons with 4.4M images, showing the network scales comfortably to more individuals.

TABLE 1

| Network | Error |
| --- | --- |
| DeepFace-1.5M | 7.00% |
| DeepFace-3.3M | 7.22% |
| DeepFace-4.4M | 8.74% |
| DeepFace-sub1 | 11.2% |
| DeepFace-sub2 | 12.6% |
| DeepFace-sub3 | 13.5% |

The depth of the networks are varied by removing one or more layers from the architecture illustrated in FIG. 5. For example, a convolution layer (e.g., C3) is removed in DNN DeepFace-sub1, a set of locally-connected layers (e.g., L4 and L5) is removed in DNN DeepFace-sub2, and a convolutional layer (e.g., C3) and multiple locally-connected layers (e.g., L4 and L5) are removed in DNN DeepFace-sub3. The DNNs are trained with 4.4M faces. The classification errors stop decreasing after a few epochs and remain at a level higher than that of the deep network DeepFace-4.4M.

Figure 8A:
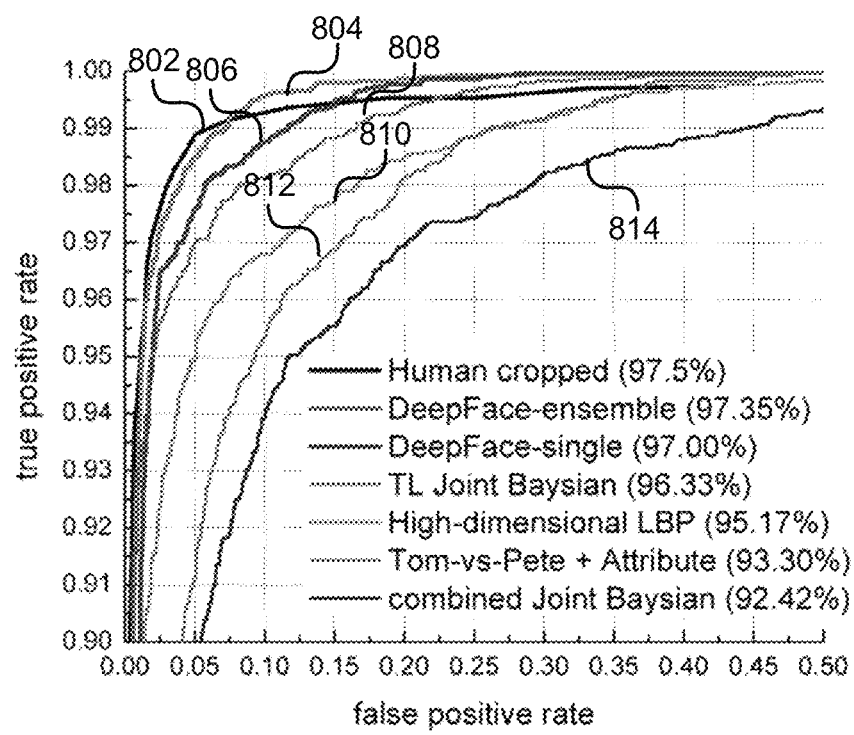
FIG. 8A illustrates Receiver Operating Characteristic ("ROC") curves of some embodiments in comparison to other methods on the LFW dataset.

FIG. 8A and Table 2 illustrate Receiver Operating Characteristic ("ROC") curves and verification accuracy of some embodiments in comparison to other methods on the LFW dataset. Curves 802, 804, 806, 808, 810, 812, and 814 correspond to human verification, an embodiment using ensemble verification (e.g., DeepFace-ensemble), an embodiment comprising a DNN learned from raw RGB pixels in the 3D aligned faces on the SFC dataset (e.g., Deepface-single), TL joint Bayesian, High-dimensional LBP, Tom-vs-Pete, and combined joint Bayesian, respectively. The DeepFace-ensemble combines distances of multiple networks trained by feeding different types of inputs to the DNN including 3D aligned RGB inputs, gray-level image plus image gradient magnitude and orientation, and the 2D-aligned RGB images. The distances are combined using a non-linear SVM (with C=1) with a simple sum of power CDF-kernels: $K_{Combined} := K_{single} + K_{gradient} + K_{align2d}$, where $K(x, y) := -\|x-y\|_2$.

TABLE 2

| Method | Accuracy | Protocol |
| --- | --- | --- |
| Joint Bayesian | 0.9242 ± 0.0108 | restricted |
| Tom-vs-Pete | 0.9330 ± 0.0128 | restricted |
| High-dim LBP | 0.9517 ± 0.0113 | restricted |
| TL Joint Bayesian | 0.9633 ± 0.0108 | restricted |
| DeepFace-single | 0.9592 ± 0.0029 | unsupervised |
| DeepFace-single | 0.9700 ± 0.0028 | restricted |
| DeepFace-ensemble | 0.9715 ± 0.0027 | restricted |
| DeepFace-ensemble | 0.9735 ± 0.0025 | unrestricted |
| Human, cropped | 0.9753 | |

The unsupervised protocol is followed to directly compare the inner product of a pair of normalized features. The restricted protocol uses the 5,400 pair labels per split for the SVM training. The unrestricted protocol, provides the operator with knowledge about the identities in the training sets, hence enabling the generation of many more training pairs to be added to the training set. As illustrated in FIG. 8A and Table 2, embodiments described herein advance other methods and closely approach human performance in face verification.

Figure 8B:
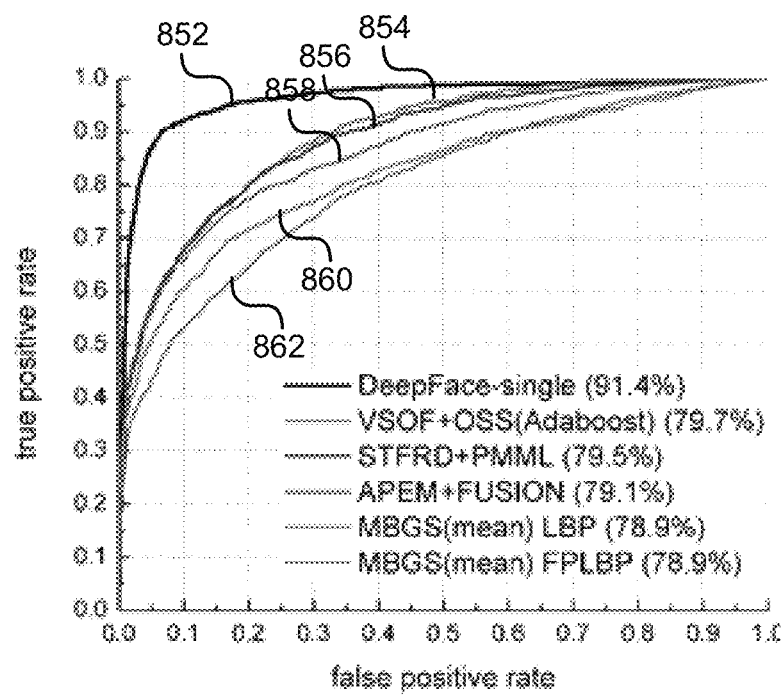
FIG. 8B illustrates Receiver Operating Characteristic ("ROC") curves of some embodiments in comparison to other methods on the YTF dataset.

FIG. 8B and Table 3 illustrate Receiver Operating Characteristic ("ROC") curves and verification accuracy of some embodiments in comparison to other methods on the YTF dataset. Curves 852, 854, 856, 858, 860, 862 correspond to an embodiment comprising a DNN learned from raw RGB pixels in the 3D aligned faces on the SFC dataset (e.g., Deepface-single), VSOF+OSS, STFRD+PMML, APEM+FUSION, MBGS (mean) LBP, and MBGS (mean) FPLBP, respectively.

TABLE 4

| Method | Accuracy | AUC | EER |
|---|---|---|---|
| MBGS + SVM– | 78.9 ± 1.9 | 86.9 | 21.2 |
| APEM + FUSION | 79.1 ± 1.5 | 86.6 | 21.4 |
| STFRD + PMML | 79.5 ± 2.5 | 88.6 | 19.9 |
| VSOF + OSS | 79.7 ± 1.8 | 89.4 | 20.0 |
| DeepFace-single | 91.4 ± 1.1 | 96.3 | 8.6 |

The image quality of YouTube® video frames is generally worse than that of web photos, mainly due to motion blur or viewing distance. For every pair of training videos, fifty (50) pairs of frames are created by taking one from each video, and these are labeled as same or not-same in accordance with the video training pair. A weighted $\chi 2$ model is learned. Given a test-pair, one hundred (100) random pairs of frames are sampled by sampling one from each video, and use the mean value of the learned weighed similarity.

As illustrated, embodiments described herein provide an accuracy of 91.4% which reduces the error of the previous best methods by more than 50%. The accuracy may be improved to 92.5% subsequent to correcting 100 wrong labels for video pairs in the YTF dataset.

Social Networking System—Example Implementation

Figure 9:
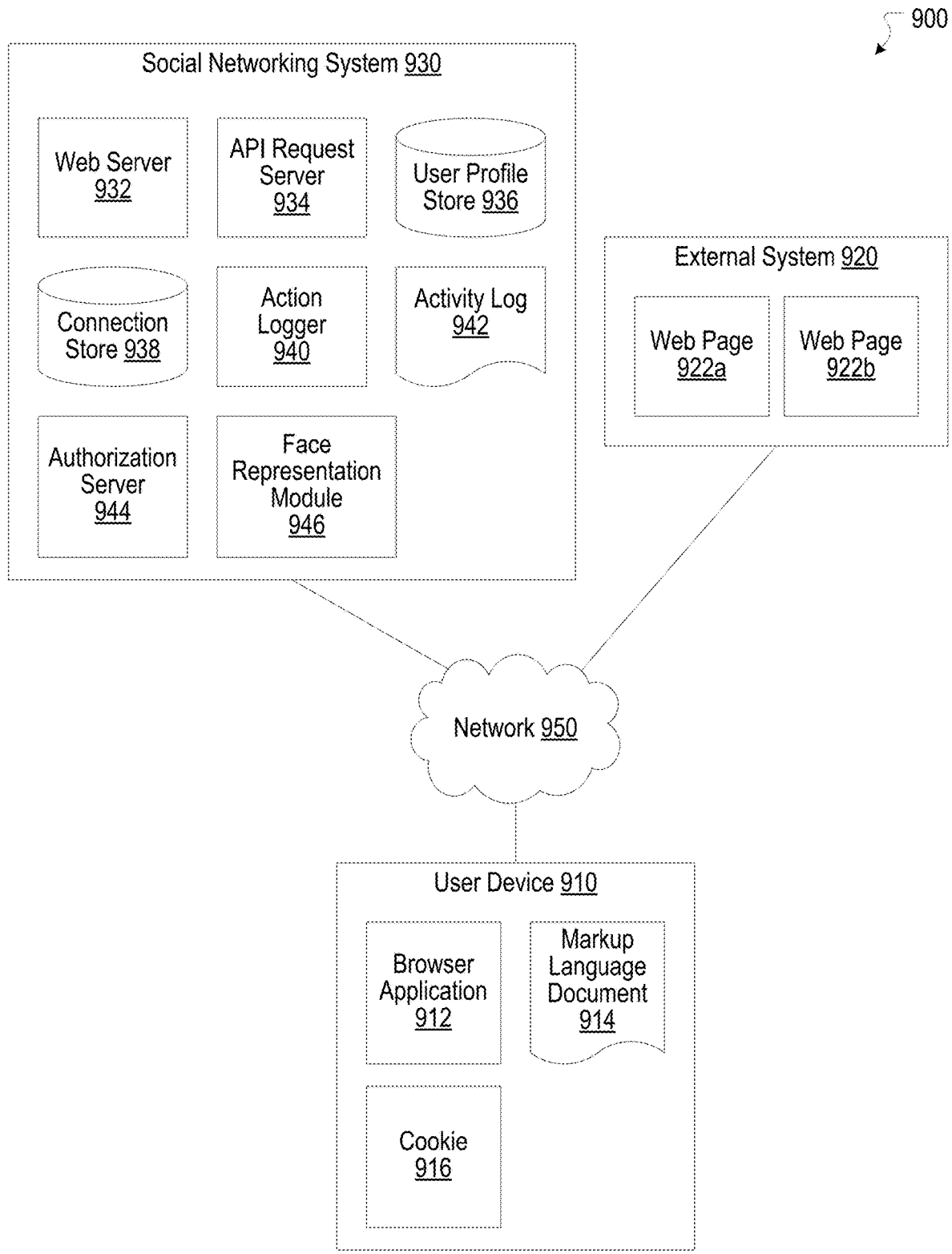
FIG. 9 illustrates a network diagram of an example system that can be utilized in various scenarios, according to an embodiment of the present disclosure.

FIG. 9 illustrates a network diagram of an example system 900 that can be utilized in various embodiments for enhanced video encoding, in accordance with an embodiment of the present disclosure. The system 900 includes one or more user devices 910, one or more external systems 920, a social networking system 930, and a network 950. In an embodiment, the social networking service, provider, and/or system discussed in connection with the embodiments described above may be implemented as the social networking system 930. For purposes of illustration, the embodiment of the system 900, shown by FIG. 9, includes a single external system 920 and a single user device 910. However, in other embodiments, the system 900 may include more user devices 910 and/or more external systems 920. In certain embodiments, the social networking system 930 is operated by a social network provider, whereas the external systems 920 are separate from the social networking system 930 in that they may be operated by different entities. In various embodiments, however, the social networking system 930 and the external systems 920 operate in conjunction to provide social networking services to users (or members) of the social networking system 930. In this sense, the social networking system 930 provides a platform or backbone, which other systems, such as external systems 920, may use to provide social networking services and functionalities to users across the Internet.

The user device 910 comprises one or more computing devices that can receive input from a user and transmit and receive data via the network 950. In one embodiment, the user device 910 is a conventional computer system executing, for example, a Microsoft Windows compatible operating system (OS), Apple OS X, and/or a Linux distribution. In another embodiment, the user device 910 can be a device having computer functionality, such as a smart-phone, a tablet, a personal digital assistant (PDA), a mobile telephone, etc. The user device 910 is configured to communicate via the network 950. The user device 910 can execute an application, for example, a browser application that allows a user of the user device 910 to interact with the social networking system 930. In another embodiment, the user device 910 interacts with the social networking system 930 through an application programming interface (API) provided by the native operating system of the user device 910, such as iOS and ANDROID. The user device 910 is configured to communicate with the external system 920 and the social networking system 930 via the network 950, which may comprise any combination of local area and/or wide area networks, using wired and/or wireless communication systems.

In one embodiment, the network 950 uses standard communications technologies and protocols. Thus, the network 950 can include links using technologies such as Ethernet, 702.11, worldwide interoperability for microwave access (WiMAX), 3G, 4G, CDMA, GSM, LTE, digital subscriber line (DSL), etc. Similarly, the networking protocols used on the network 950 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 950 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 910 may display content from the external system 920 and/or from the social networking system 930 by processing a markup language document 914 received from the external system 920 and from the social networking system 930 using a browser application 912. The markup language document 914 identifies content and one or more instructions describing formatting or presentation of the content. By executing the instructions included in the markup language document 914, the browser application 912 displays the identified content using the format or presentation described by the markup language document 914. For example, the markup language document 914 includes instructions for generating and displaying a web page having multiple frames that include text and/or image data retrieved from the external system 920 and the social networking system 930. In various embodiments, the markup language document 914 comprises a data file including extensible markup language (XML) data, extensible hypertext markup language (XHTML) data, or other markup language data. Additionally, the markup language document 914 may include JavaScript Object Notation (JSON) data, JSON with padding (JSONP), and JavaScript data to facilitate data-interchange between the external system 920 and the user device 910. The browser application 912 on the user device 910 may use a JavaScript compiler to decode the markup language document 914.

The markup language document 914 may also include, or link to, applications or application frameworks such as FLASH™ or Unity™ applications, the SilverLight™ application framework, etc.

In one embodiment, the user device 910 also includes one or more cookies 916 including data indicating whether a user of the user device 910 is logged into the social networking system 930, which may enable modification of the data communicated from the social networking system 930 to the user device 910.

The external system 920 includes one or more web servers that include one or more web pages 922a, 922b, which are communicated to the user device 910 using the network 950. The external system 920 is separate from the social networking system 930. For example, the external system 920 is associated with a first domain, while the social networking system 930 is associated with a separate social networking domain. Web pages 922a, 922b, included in the external system 920, comprise markup language documents 914 identifying content and including instructions specifying formatting or presentation of the identified content.

The social networking system 930 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 930 may be administered, managed, or controlled by an operator. The operator of the social networking system 930 may be a human being, an automated application, or a series of applications for managing content, regulating policies, and collecting usage metrics within the social networking system 930. Any type of operator may be used.

Users may join the social networking system 930 and then add connections to any number of other users of the social networking system 930 to whom they desire to be connected. As used herein, the term "friend" refers to any other user of the social networking system 930 to whom a user has formed a connection, association, or relationship via the social networking system 930. For example, in an embodiment, if users in the social networking system 930 are represented as nodes in the social graph, the term "friend" can refer to an edge formed between and directly connecting two user nodes.

Connections may be added explicitly by a user or may be automatically created by the social networking system 930 based on common characteristics of the users (e.g., users who are alumni of the same educational institution). For example, a first user specifically selects a particular other user to be a friend. Connections in the social networking system 930 are usually in both directions, but need not be, so the terms "user" and "friend" depend on the frame of reference. Connections between users of the social networking system 930 are usually bilateral ("two-way"), or "mutual," but connections may also be unilateral, or "one-way." For example, if Bob and Joe are both users of the social networking system 930 and connected to each other, Bob and Joe are each other's connections. If, on the other hand, Bob wishes to connect to Joe to view data communicated to the social networking system 930 by Joe, but Joe does not wish to form a mutual connection, a unilateral connection may be established. The connection between users may be a direct connection; however, some embodiments of the social networking system 930 allow the connection to be indirect via one or more levels of connections or degrees of separation.

In addition to establishing and maintaining connections between users and allowing interactions between users, the social networking system 930 provides users with the ability to take actions on various types of items supported by the social networking system 930. These items may include groups or networks (i.e., social networks of people, entities, and concepts) to which users of the social networking system 930 may belong, events or calendar entries in which a user might be interested, computer-based applications that a user may use via the social networking system 930, transactions that allow users to buy or sell items via services provided by or through the social networking system 930, and interactions with advertisements that a user may perform on or off the social networking system 930. These are just a few examples of the items upon which a user may act on the social networking system 930, and many others are possible. A user may interact with anything that is capable of being represented in the social networking system 930 or in the external system 920, separate from the social networking system 930, or coupled to the social networking system 930 via the network 950.

The social networking system 930 is also capable of linking a variety of entities. For example, the social networking system 930 enables users to interact with each other as well as external systems 920 or other entities through an API, a web service, or other communication channels. The social networking system 930 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 930. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 930 modifies edges connecting the various nodes to reflect the relationships and interactions.

The social networking system 930 also includes user-generated content, which enhances a user's interactions with the social networking system 930. User-generated content may include anything a user can add, upload, send, or "post" to the social networking system 930. For example, a user communicates posts to the social networking system 930 from a user device 910. Posts may include data such as status updates or other textual data, location information, images such as photos, videos, links, music or other similar data and/or media. Content may also be added to the social networking system 930 by a third party. Content "items" are represented as objects in the social networking system 930. In this way, users of the social networking system 930 are encouraged to communicate with each other by posting text and content items of various types of media through various communication channels. Such communication increases the interaction of users with each other and increases the frequency with which users interact with the social networking system 930.

The social networking system 930 includes a web server 932, an API request server 934, a user profile store 936, a connection store 938, an action logger 940, an activity log 942, and an authorization server 944. In an embodiment of the invention, the social networking system 930 may include additional, fewer, or different components for various applications. Other components, such as network interfaces, security mechanisms, load balancers, failover servers, management and network operations consoles, and the like are not shown so as to not obscure the details of the system.

The user profile store 936 maintains information about user accounts, including biographic, demographic, and other types of descriptive information, such as work experience, educational history, hobbies or preferences, location, and the like that has been declared by users or inferred by the social networking system 930. This information is stored in the user profile store 936 such that each user is uniquely identified. The social networking system 930 also stores data describing one or more connections between different users in the connection store 938. The connection information may indicate users who have similar or common work experience, group memberships, hobbies, or educational history. Additionally, the social networking system 930 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 930, such as non-person entities, buckets, cluster centers, images, interests, pages, external systems, concepts, and the like are also stored in the connection store 938.

The social networking system 930 maintains data about objects with which a user may interact. To maintain this data, the user profile store 936 and the connection store 938 store instances of the corresponding type of objects maintained by the social networking system 930. Each object type has information fields that are suitable for storing information appropriate to the type of object. For example, the user profile store 936 contains data structures with fields suitable for describing a user's account and information related to a user's account. When a new object of a particular type is created, the social networking system 930 initializes a new data structure of the corresponding type, assigns a unique object identifier to it, and begins to add data to the object as needed. This might occur, for example, when a user becomes a user of the social networking system 930, the social networking system 930 generates a new instance of a user profile in the user profile store 936, assigns a unique identifier to the user account, and begins to populate the fields of the user account with information provided by the user.

The connection store 938 includes data structures suitable for describing a user's connections to other users, connections to external systems 920 or connections to other entities. The connection store 938 may also associate a connection type with a user's connections, which may be used in conjunction with the user's privacy setting to regulate access to information about the user. In an embodiment of the invention, the user profile store 936 and the connection store 938 may be implemented as a federated database.

Data stored in the connection store 938, the user profile store 936, and the activity log 942 enables the social networking system 930 to generate the social graph that uses nodes to identify various objects and edges connecting nodes to identify relationships between different objects. For example, if a first user establishes a connection with a second user in the social networking system 930, user accounts of the first user and the second user from the user profile store 936 may act as nodes in the social graph. The connection between the first user and the second user stored by the connection store 938 is an edge between the nodes associated with the first user and the second user. Continuing this example, the second user may then send the first user a message within the social networking system 930. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 930 (or, alternatively, in an image maintained by another system outside of the social networking system 930). The image may itself be represented as a node in the social networking system 930. This tagging action may create edges between the first user and the second user as well as create an edge between each of the users and the image, which is also a node in the social graph. In yet another example, if a user confirms attending an event, the user and the event are nodes obtained from the user profile store 936, where the attendance of the event is an edge between the nodes that may be retrieved from the activity log 942. By generating and maintaining the social graph, the social networking system 930 includes data describing many different types of objects and the interactions and connections among those objects, providing a rich source of socially relevant information.

The web server 932 links the social networking system 930 to one or more user devices 910 and/or one or more external systems 920 via the network 950. The web server 932 serves web pages, as well as other web-related content, such as Java, JavaScript, Flash, XML, and so forth. The web server 932 may include a mail server or other messaging functionality for receiving and routing messages between the social networking system 930 and one or more user devices 910. The messages can be instant messages, queued messages (e.g., email), text and SMS messages, or any other suitable messaging format.

The API request server 934 allows one or more external systems 920 and user devices 910 to call access information from the social networking system 930 by calling one or more API functions. The API request server 934 may also allow external systems 920 to send information to the social networking system 930 by calling APIs. The external system 920, in one embodiment, sends an API request to the social networking system 930 via the network 950, and the API request server 934 receives the API request. The API request server 934 processes the request by calling an API associated with the API request to generate an appropriate response, which the API request server 934 communicates to the external system 920 via the network 950. For example, responsive to an API request, the API request server 934 collects data associated with a user, such as the user's connections that have logged into the external system 920, and communicates the collected data to the external system 920. In another embodiment, the user device 910 communicates with the social networking system 930 via APIs in the same manner as external systems 920.

The action logger 940 is capable of receiving communications from the web server 932 about user actions on and/or off the social networking system 930. The action logger 940 populates the activity log 942 with information about user actions, enabling the social networking system 930 to discover various actions taken by its users within the social networking system 930 and outside of the social networking system 930. Any action that a particular user takes with respect to another node on the social networking system 930 may be associated with each user's account, through information maintained in the activity log 942 or in a similar database or other data repository. Examples of actions taken by a user within the social networking system 930 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 930, the action is recorded in the activity log 942. In one embodiment, the social networking system 930 maintains the activity log 942 as a database of entries. When an action is taken within the social networking system 930, an entry for the action is added to the activity log 942. The activity log 942 may be referred to as an action log.

Additionally, user actions may be associated with concepts and actions that occur within an entity outside of the social networking system 930, such as an external system 920 that is separate from the social networking system 930. For example, the action logger 940 may receive data describing a user's interaction with an external system 920 from the web server 932. In this example, the external system 920 reports a user's interaction according to structured actions and objects in the social graph.

Other examples of actions where a user interacts with an external system 920 include a user expressing an interest in an external system 920 or another entity, a user posting a comment to the social networking system 930 that discusses an external system 920 or a web page 922a within the external system 920, a user posting to the social networking system 930 a Uniform Resource Locator (URL) or other identifier associated with an external system 920, a user attending an event associated with an external system 920, or any other action by a user that is related to an external system 920. Thus, the activity log 942 may include actions describing interactions between a user of the social networking system 930 and an external system 920 that is separate from the social networking system 930.

The authorization server 944 enforces one or more privacy settings of the users of the social networking system 930. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 920, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 920. One embodiment allows the specification of the set of entities to comprise an enumeration of entities. For example, the user may provide a list of external systems 920 that are allowed to access certain information. Another embodiment allows the specification to comprise a set of entities along with exceptions that are not allowed to access the information. For example, a user may allow all external systems 920 to access the user's work information, but specify a list of external systems 920 that are not allowed to access the work information. Certain embodiments call the list of exceptions that are not allowed to access certain information a "block list". External systems 920 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 944 contains logic to determine if certain information associated with a user can be accessed by a user's friends, external systems 920, and/or other applications and entities. The external system 920 may need authorization from the authorization server 944 to access the user's more private and sensitive information, such as the user's work phone number. Based on the user's privacy settings, the authorization server 944 determines if another user, the external system 920, an application, or another entity is allowed to access information associated with the user, including information about actions taken by the user.

The social networking system 930 can include a face representation module 946. In some embodiments, the face representation transfer module 946 can be implemented as the face representation module 102 of FIG. 1. The face representation transfer module 946 can be configured to align face images, classify face images, and/or verify face images by employing a deep neural network, according to an embodiment of the present disclosure.

Hardware Implementation

Figure 10:
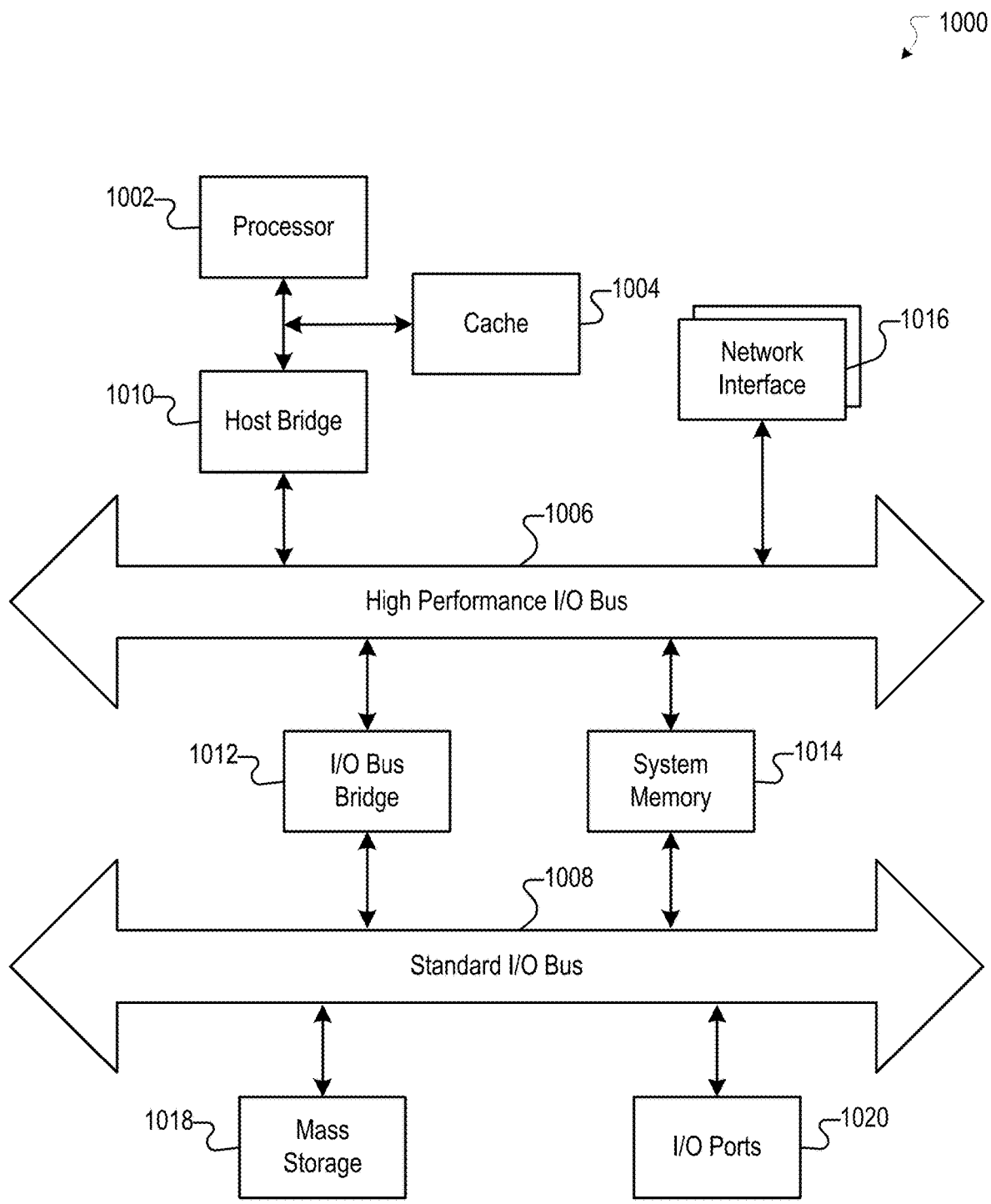
FIG. 10 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 10 illustrates an example of a computer system 1000 that may be used to implement one or more of the embodiments described herein in accordance with an embodiment of the invention. The computer system 1000 includes sets of instructions for causing the computer system 1000 to perform the processes and features discussed herein. The computer system 1000 may be connected (e.g., networked) to other machines. In a networked deployment, the computer system 1000 may operate in the capacity of a server machine or a client machine in a client-server network environment, or as a peer machine in a peer-to-peer (or distributed) network environment. In an embodiment of the invention, the computer system 1000 may be the social networking system 1030, the user device 910, and the external system 1020, or a component thereof. In an embodiment of the invention, the computer system 1000 may be one server among many that constitutes all or part of the social networking system 1030.

The computer system 1000 includes a processor 1002, a cache 1004, and one or more executable modules and drivers, stored on a computer-readable medium, directed to the processes and features described herein. Additionally, the computer system 1000 includes a high performance input/output (I/O) bus 1006 and a standard I/O bus 1008. A host bridge 1010 couples processor 1002 to high performance I/O bus 1006, whereas I/O bus bridge 1012 couples the two buses 1006 and 1008 to each other. A system memory 1014 and one or more network interfaces 1016 couple to high performance I/O bus 1006. The computer system 1000 may further include video memory and a display device coupled to the video memory (not shown). Mass storage 1018 and I/O ports 1020 couple to the standard I/O bus 1008. The computer system 1000 may optionally include a keyboard and pointing device, a display device, or other input/output devices (not shown) coupled to the standard I/O bus 1008. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 1000, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 1000 are described in greater detail below. In particular, the network interface 1016 provides communication between the computer system 1000 and any of a wide range of networks, such as an Ethernet (e.g., IEEE 802.3) network, a backplane, etc. The mass storage 1018 provides permanent storage for the data and programming instructions to perform the above-described processes and features implemented by the respective computing systems identified above, whereas the system memory 1014 (e.g., DRAM) provides temporary storage for the data and programming instructions when executed by the processor 1002. The I/O ports 1020 may be one or more serial and/or parallel communication ports that provide communication between additional peripheral devices, which may be coupled to the computer system 1000.

The computer system 1000 may include a variety of system architectures, and various components of the computer system 1000 may be rearranged. For example, the cache 1004 may be on-chip with processor 1002. Alternatively, the cache 1004 and the processor 1002 may be packed together as a "processor module", with processor 1002 being referred to as the "processor core". Furthermore, certain embodiments of the invention may neither require nor include all of the above components. For example, peripheral devices coupled to the standard I/O bus 1008 may couple to the high performance I/O bus 1006. In addition, in some embodiments, only a single bus may exist, with the components of the computer system 1000 being coupled to the single bus. Furthermore, the computer system 1000 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 1000 that, when read and executed by one or more processors, cause the computer system 1000 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 1000, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 1002. Initially, the series of instructions may be stored on a storage device, such as the mass storage 1018. However, the series of instructions can be stored on any suitable computer readable storage medium. Furthermore, the series of instructions need not be stored locally, and could be received from a remote storage device, such as a server on a network, via the network interface 1016. The instructions are copied from the storage device, such as the mass storage 1018, into the system memory 1014 and then accessed and executed by the processor 1002. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 1000 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed:

1. A computer-implemented method, comprising:
   determining, by a computing system, a set of fiducial points in a 2D image based on a first model trained to predict fiducial point configurations;
   generating, by the computing system, a 2D face image based on the set of fiducial points determined in the 2D image;
   generating, by the computing system, a 3D-aligned face image from the 2D face image, the generating further comprising:
      determining, by the computing system, a localized set of fiducial points in the 2D face image based on a second model trained to predict fiducial point configurations and
      transforming, by the computing system, the 2D face image to the 3D-aligned face image based at least in part on a piece-wise affine warping of the localized set of fiducial points in the 2D face image to the 3D-aligned face image; and
   classifying, by the computing system, a facial identity corresponding to the 2D face image based at least in part on the 3D-aligned face image, wherein the classifying further comprises:
      providing, by the computing system, the 3D-aligned face image as input to a deep neural network, wherein the deep neural network comprises at least a convolutional pooling layer and a set of locally-connected layers, wherein the convolutional pooling layer is configured to extract a first set of features from the 3D-aligned face image and at least one locally-connected layer is configured to extract a second set of features from the 3D-aligned face image.

2. The computer-implemented method of claim 1, wherein transforming the 2D face image to the 3D-aligned face image further comprises:
   generating, by the computing system, a set of anchor points that are placed on a 3D shape of a human face, wherein an anchor point corresponds to a fiducial point in the localized set of fiducial points determined for the 2D face image; and
   transforming, by the computing system, the 2D face image to the 3D-aligned face image based on the localized set of fiducial points and the set of anchor points.

3. The computer-implemented method of claim 2, wherein the 3D shape of the human face is generated based on an average of a plurality of 3D scans of human faces.

4. The computer-implemented method of claim 1, wherein
   the deep neural network is trained to classify the facial identity corresponding to the 2D face image based on a feature vector representation of the 3D-aligned face image.

5. The computer-implemented method of claim 4, wherein the deep neural network includes a set of fully connected layers, wherein the 3D-aligned face image is provided as input to the convolutional pooling layer, and wherein the set of fully connected layers output the feature vector representation of the 3D-aligned face image.

6. The computer-implemented method of claim 5, wherein the convolutional pooling layer includes at least a first convolutional layer, a max pooling layer, and a second convolutional layer, wherein at least the first convolutional layer includes a set of filters that each generate a feature map.

7. The computer-implemented method of claim 6, wherein feature maps generated by the first convolutional layer are provided as inputs to the max pooling layer, and wherein outputs from the max pooling layer are provided as inputs to the second convolutional layer.

8. The computer-implemented method of claim 1, wherein determining the localized set of fiducial points in the 2D face image further comprises:
   determining, by the computing system, a face portion in the 2D face image.

9. The computer-implemented method of claim 1, wherein the face portion in the 2D face image is determined based at least in part on a first machine learning regression model, and wherein the set of fiducial points in the 2D face image are localized based at least in part on a second machine learning regression model that is different from the first machine learning regression model.

10. A system comprising:
    at least one processor; and
    a memory storing instructions that, when executed by the at least one processor, cause the system to perform:
    determining a set of fiducial points in a 2D image based on a first model trained to predict fiducial point configurations;
    generating a 2D face image based on the set of fiducial points determined in the 2D image;
    generating a 3D-aligned face image from the 2D face image, the generating further comprising:
       determining a localized set of fiducial points in the 2D face image based on a second model trained to predict fiducial point configurations and
       transforming the 2D face image to the 3D-aligned face image based at least in part on a piece-wise affine warping of the localized set of fiducial points in the 2D face image to the 3D-aligned face image; and
    classifying a facial identity corresponding to the 2D face image based at least in part on the 3D-aligned face image, wherein the classifying further comprises:
       providing the 3D-aligned face image as input to a deep neural network, wherein the deep neural network comprises at least a convolutional pooling layer and a set of locally-connected layers, wherein the convolutional pooling layer is configured to extract a first set of features from the 3D-aligned face image and at least one locally-connected layer is configured to extract a second set of features from the 3D-aligned face image.

11. The system of claim 10, wherein transforming the 2D face image to the 3D-aligned face image further causes the system to perform:
    generating a set of anchor points that are placed on a 3D shape of a human face, wherein an anchor point corresponds to a fiducial point in the localized set of fiducial points determined for the 2D face image; and
    transforming the 2D face image to the 3D-aligned face image based on the localized set of fiducial points and the set of anchor points.

12. The system of claim 11, wherein the 3D shape of the human face is generated based on an average of a plurality of 3D scans of human faces.

13. The system of claim 10, wherein
    the deep neural network is trained to classify the facial identity corresponding to the 2D face image based on a feature vector representation of the 3D-aligned face image.

14. A non-transitory computer-readable storage medium including instructions that, when executed by at least one processor of a computing system, cause the computing system to perform:
    determining a set of fiducial points in a 2D image based on a first model trained to predict fiducial point configurations;
    generating a 2D face image based on the set of fiducial points determined in the 2D image;
    generating a 3D-aligned face image from the 2D face image, the generating further comprising:
        determining a localized set of fiducial points in the 2D face image based on a second model trained to predict fiducial point configurations and
        transforming the 2D face image to the 3D-aligned face image based at least in part on a piece-wise affine warping of the localized set of fiducial points in the 2D face image to the 3D-aligned face image; and
    classifying a facial identity corresponding to the 2D face image based at least in part on the 3D-aligned face image, wherein the classifying further comprises:
    providing the 3D-aligned face image as input to a deep neural network, wherein the deep neural network comprises at least a convolutional pooling layer and a set of locally-connected layers, wherein the convolutional pooling layer is configured to extract a first set of features from the 3D-aligned face image and at least one locally-connected layer is configured to extract a second set of features from the 3D-aligned face image.

15. The non-transitory computer-readable storage medium of claim 14, wherein transforming the 2D face image to the 3D-aligned face image further causes the computing system to perform:
    generating a set of anchor points that are placed on a 3D shape of a human face, wherein an anchor point corresponds to a fiducial point in the localized set of fiducial points determined for the 2D face image; and
    transforming the 2D face image to the 3D-aligned face image based on the localized set of fiducial points and the set of anchor points.

16. The non-transitory computer-readable storage medium of claim 15, wherein the 3D shape of the human face is generated based on an average of a plurality of 3D scans of human faces.

17. The non-transitory computer-readable storage medium of claim 14, wherein
    the deep neural network is trained to classify the facial identity corresponding to the 2D face image based on a feature vector representation of the 3D-aligned face image.

* * * * *